United States Patent [19]

Brittain

[11] 4,293,947
[45] Oct. 6, 1981

[54] INFORMATION HANDLING SYSTEM

[75] Inventor: William J. Brittain, Westcliff-On-Sea, England

[73] Assignee: Ford Motor Company, Dearborn, Mich.

[21] Appl. No.: 950,095

[22] Filed: Oct. 10, 1978

[30] Foreign Application Priority Data

Oct. 12, 1977 [GB] United Kingdom ............... 42402/77
Oct. 12, 1977 [GB] United Kingdom ............... 42403/77
Oct. 12, 1977 [GB] United Kingdom ............... 42404/77

[51] Int. Cl.³ ............................................... H04J 6/00
[52] U.S. Cl. ....................................... 370/89; 370/15; 370/92
[58] Field of Search ...... 179/15 AL, 15 BM, 15 AW, 179/15 AQ; 325/38 A; 370/86, 87, 88, 89, 68, 11, 9

[56] References Cited

U.S. PATENT DOCUMENTS 3,588,365  6/1971  McNeilly ....................... 179/15 AL
3,651,454  3/1972  Venema ......................... 179/15 AL
3,959,594  5/1976  Srivastava ..................... 179/15 AL Primary Examiner—David L. Stewart
Attorney, Agent, or Firm—Peter Abolins; Clifford L. Sadler

[57] ABSTRACT

An information handling system particularly suitable for motor vehicle use. A master station is arranged to transmit information to, and to receive and display information from, a plurality of sequentially-addressed peripheral stations. Synchronization and clock signals, as well as information control signals, are transmitted by the master station to the various peripheral stations, each of which responds to a particular information frame. An address code determines the information frame to which a given peripheral station responds. The peripheral station may control devices actuated by connection to a power bus or sensors from which information is obtained and transmitted to the master station for display.

1 Claim, 10 Drawing Figures

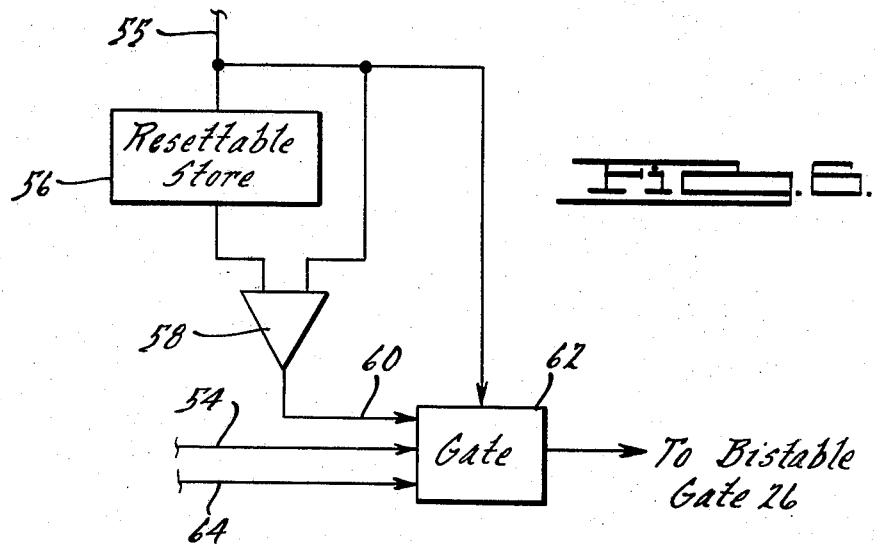
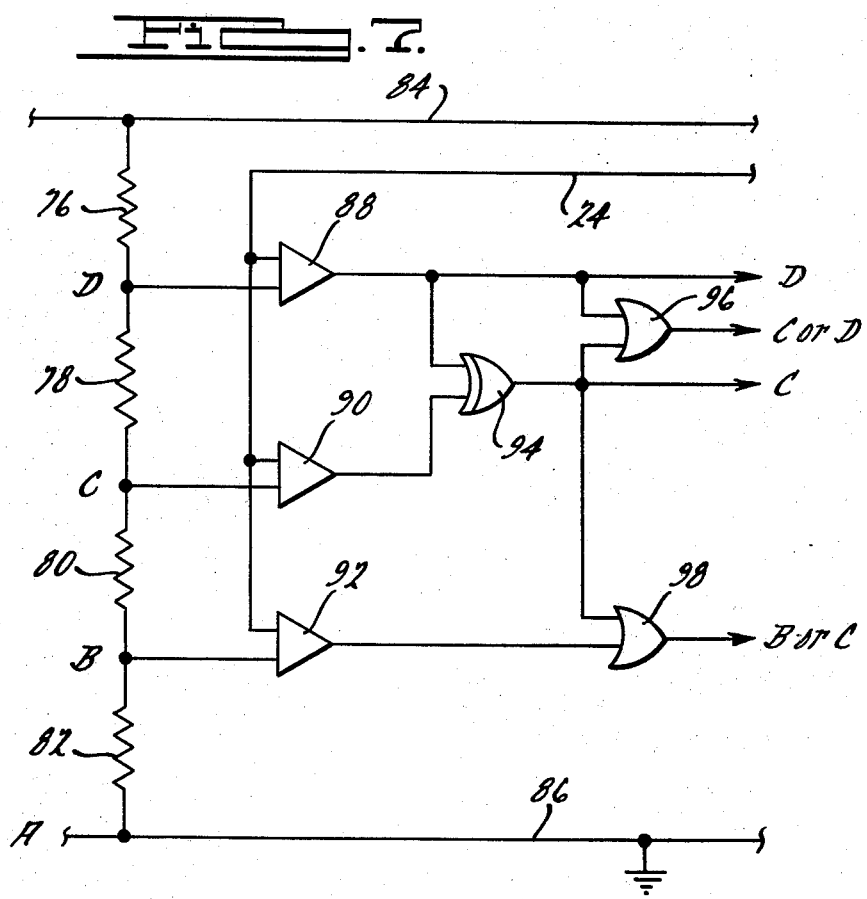

INFORMATION HANDLING SYSTEM

CROSS-REFERENCE TO RELATED APPLICATIONS

This invention is related to the inventor's commonly-assigned, concurrently-filed and co-pending application Ser. No. 950,104, entitled "IMPROVED PERIPHERAL STATION IN AN INFORMATION HANDLING SYSTEM".

BACKGROUND

This invention relates to a multiplex communication system and is particularly, but not exclusively, intended for use in motor vehicles.

Conventional practice in motor vehicles has been to provide each powered device (light, horn, windscreen wiper motor, etc.) with its own power lead and associated driver's control switch, and to provide a number of warning and indicating instruments (fuel gauge, tachometer, oil pressure warning, etc.) each connected to an appropriate sensor by separate wiring. This gives rise to wiring looms of considerable complexity and cost. It is also necessary to fabricate and stock different wiring harnesses for each model of vehicle.

There have hitherto been a considerable number of proposals to overcome these problems by using a common channel interconnecting all electrically powered devices and monitoring devices with a central control station, information being passed along the channel by multiplexing techniques. None of these proposals has yet been put into practice in volume vehicle production, principally for reasons of cost, and/or complexity. The factors which can be identified as necessary for a commercially viable system are:

(a) the system must be mechanically simple and robust;

(b) the number of different components required must be kept to a minimum;

(c) the system must be sufficiently fast to maintain information such as road and engine speed sufficiently up to date in real time for the purposes of the driver;

(d) it must be possible to control at least 50 functions and to receive information from a similar number of sensors; and (e) there must be signal security which prevents spurious signals caused by interference effecting erroneous operation of controlled devices.

Of the systems previously proposed, some have been too slow or have too small a channel capacity to be suitable for use in vehicles, while others have achieved the required speed and channel capacity by using long trains of pulses at high repetition rates which requires the use of high frequency components with attendant expense. Other systems are unsuitable because they require a number of signal-carrying conductors, which increases cost and the risk of incorrect connection.

PRIOR ART REFERENCES

British Pat. No. 1,427,133 to Clements et al discloses electrical apparatus for monitoring the operational parameters and controlling the operational functions of a motor vehicle. The disclosed apparatus comprises electrical devices spaced from one another in the vehicle, signaling and power supply lines, and devices coupled to both lines and arranged to respond to a respective one of a group of signals. The information is conveyed along the signaling line and is coded using pulse width and pulse amplitude modulation techniques. The apparatus employs a synchronizing pulse at the beginning of a pulse train and sensors and operative units respond to the various pulses in sequence. A verifying circuit is used to compare the width of appropriate successive pulses.

U.S. Pat. No. 3,846,639 to Ueda et al discloses a control system for a vehicle in which a transmitter responds to clock pulses to generate a pulse train including an index pulse and pulse-width-modulated pulses arranged in a predetermined order resulting from respective signal pulses, one for each device to be controlled or monitored. The pulse train is transmitted by a single line to a plurality of detectors. Width discrimination of the received pulses is utilized to determine whether the associated electrical device or monitor should be activated.

U.S. Pat. No. 3,651,454 to Venema et al discloses a multiplex system for communicating control and power between components and for monitoring certain conditions of other components in a motor vehicle. A cable traveling about the vehicle has separate power and signal conductors. A clock signal source is coupled to the signal conductor. A plurality of transmitters, which have delay means responsive only to the clock signal for transmitting in definite time channels determined by their delay and a plurality of receivers which have delay means responsive only to the clock signal for receiving in only one of the definite channels, are coupled to the cable so that transmitters and receivers may control and activate different vehicle components provided for receiving the associated signal from the corresponding unit. FIG. 7 of this patent discloses a method and device for connecting the receiving or transmitting unit of the system to the cable. This apparatus is used for tapping into the single cable in parallel to other units by use of a piercing plug.

U.S. Pat. No. 3,864,578 to Lackey teaches a multiplexing system for controlling operation of vehicle components in response to the operation of corresponding controls by the operator of the vehicle. The system includes encoding means, decoding means and relay means. The encoding means provide a timing signal and code signal having signal components corresponding to the positions of each of the vehicle's controls. The decoder means are remote from the endcoder meand and are responsive to the signals selectively to provide a plurality of outputs to the relay means in response to the respective code signal components.

Other U.S. patents of general interest are U.S. Pat. Nos. 3,964,302 to Gordon et al, 3,544,803 to Taylor, 3,742,447 to Sognefest et al and 3,842,249 to Geyer et al.

SUMMARY OF THE INVENTION

The invention accordingly seeks to provide a communication system which overcomes or reduces the disadvantages of the prior art proposals.

According to the invention there is provided an information handling system comprising:

a signal bus;

a master station arranged to transmit on the signal bus pulse signals divided into serial information frames;

a plurality of peripheral stations each connected to the signal bus for actuation in response to a given information frame, and each connected to at least one sensor or controlled device by connector means; and a corresponding plurality of address setting means each connected externally to a respective peripheral station to set a code determining the information frame to which that station responds.

BRIEF DESCRIPTION OF THE DRAWINGS

An embodiment of the present invention will now be described, by way of example, with reference to the accompanying drawings, in which:

FIGS. 6 to 8 and 10 are more detailed circuit diagrams of parts of the circuit of FIG. 2.

DETAILED DESCRIPTION

Figure 1:
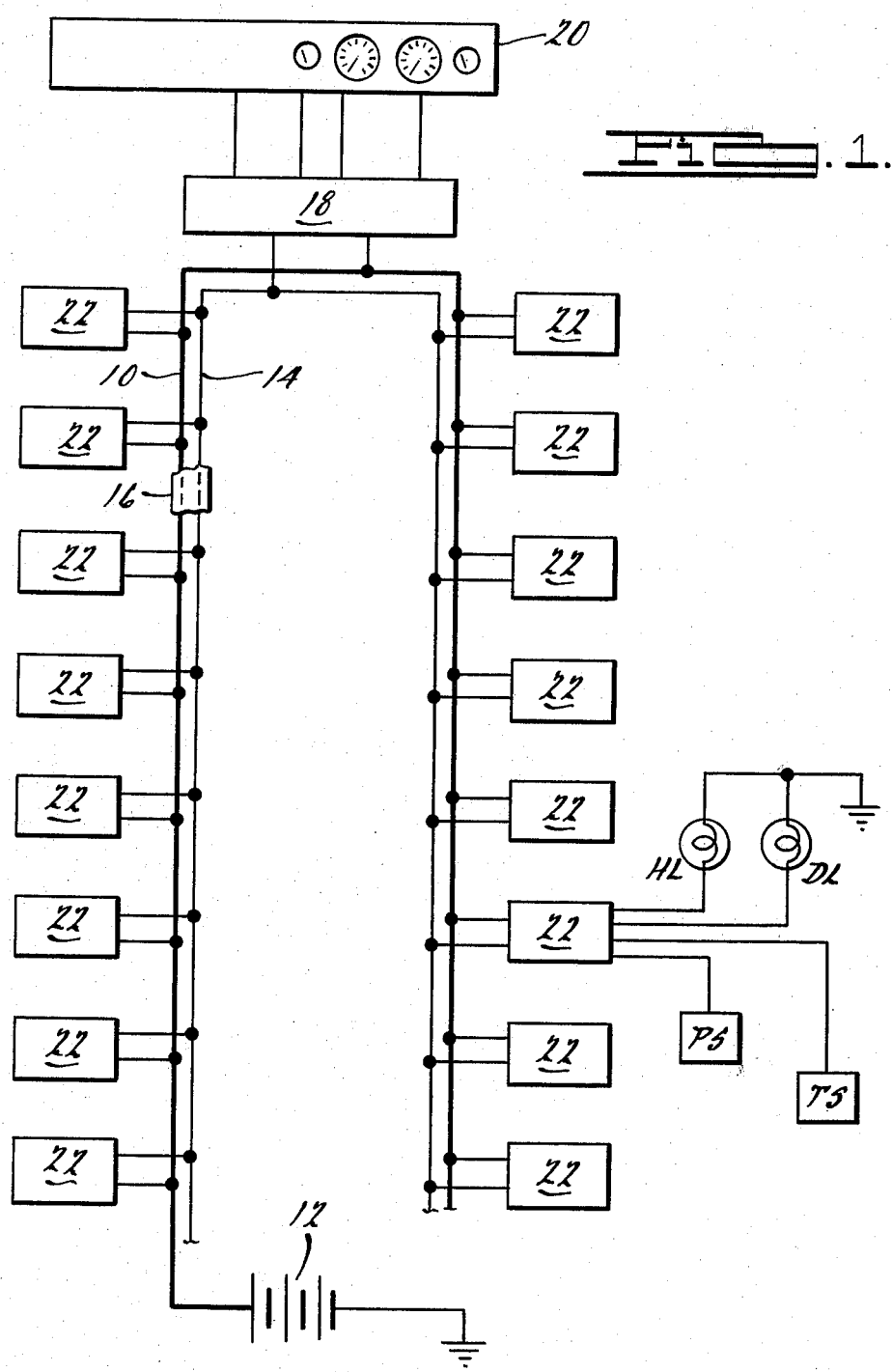
FIG. 1 is a block diagram of an information handling system for use in a motor vehicle.

With reference to FIG. 1, the system has a power bus 10 in circuit with a storage battery 12. The power bus 10 is formed by a single conductor, the return circuit being provided via vehicle ground. A signal bus 14 is associated with the power bus 10, and also comprises a single conductor. The buses 10 and 14 are molded into a single insulating sheath 16 (FIG. 4) to form a unitary bus member which may readily be passed around a vehicle in a convenient route.

A master station 18 is connected to the buses 10 and 14, and to a vehicle control panel 20. Sixteen peripheral stations 22 are each connected to the buses 10 and 14. Each peripheral unit is connected by external leads to up to four controlled devices and up to four sensors; by way of example, one of the stations 22 in FIG. 1 is shown connected to a headlight HL, a direction indicator light DL, a temperature sensor TS and an oil pressure sensor PS. The connections of the other peripheral stations 22 are not shown, for clarity of the drawing.

The control panel 20 contains the usual control switches, warning lights, and instruments for use by the driver. The master station 18 scans the driver-actuated controls in a sequential manner and transmits a sixteen-frame signal which is acted upon by the peripheral stations to activate or de-activate the devices and sensors. At the same time, the outputs of sensors for functions such as oil pressure, coolant temperature, road speed etc. are coupled to the corresponding peripheral stations 22 and are then repetitively called up by the master station 18, decoded, and displayed as appropriate on warning lights and instruments on the control panel 20.

Each of the sixteen peripheral stations 20 is responsive to a particular one of the sixteen frames of the complete scan signal transmitted by the master station 18. Eight clock pulses occur during each but the first frame; a four-bit counter in each peripheral station 60 counts every eighth of these clock pulses until reset by a synchronizing pulse that occurs at the beginning of the first frame. When a clock pulse causes the count in the four-bit counter of a given peripheral station to correspond to a four-bit address code applied to the station, the station responds to the information and control provided by the master station during the particular frame initiated by such clock pulse. If the peripheral station addresses are sequential, then each new clock pulse initiating a frame causes another of the peripheral stations to respond to the information and control of such frame. After all sixteen stations have responded, the sixteen-frame scan sequence is repeated.

The manner in which information handling is accomplished in the peripheral stations will now be discussed with reference to FIGS. 2 and 3.

Figure 3:
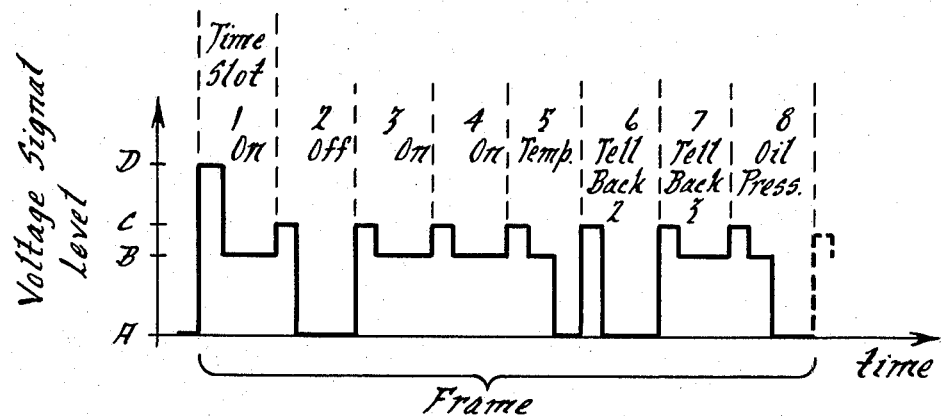
FIG. 3 shows a typical pulse train used in the apparatus of FIGS. 1 and 2.

FIG. 3 shows the voltage level of a typical signal on the signal bus 14. The voltage at any instant is controlled at one of four levels, labelled A, B, C and D. Level A is suitably tied to the vehicle voltage. The master station 18 includes a clock circuit which cyclically generates synchronizing (sync) and clock pulses. Sync pulses are set at level D and occur once per complete scan (in this case 16 frames). Clock pulses are at level C and subdivide each frame into equal time slots, in this embodiment eight in number. Information is conveyed by controlling the signals within the time slots at levels A and B.

Figure 2:
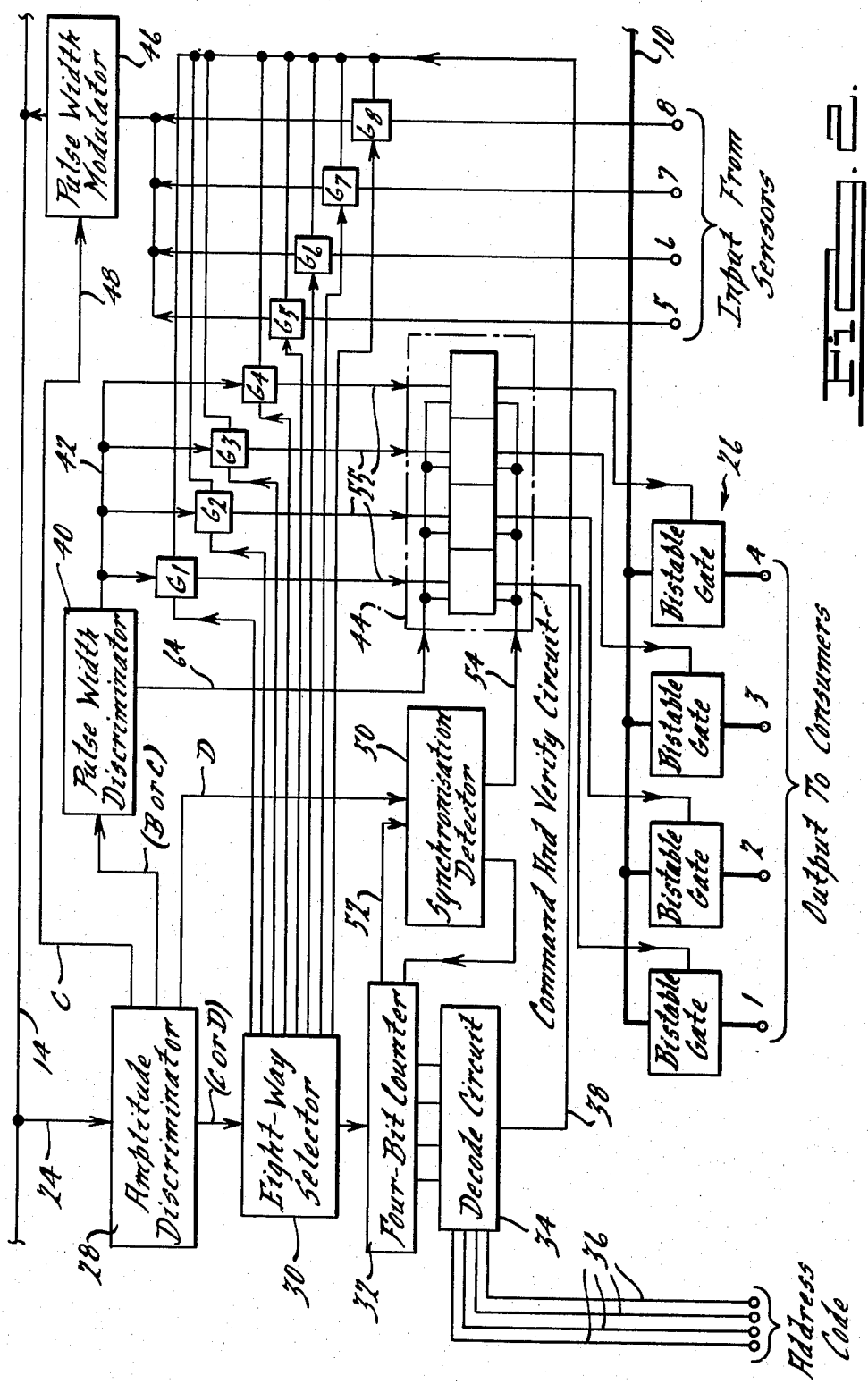
FIG. 2 is a detailed circuit diagram of one of the peripheral stations of FIG. 1.

With particular reference to FIG. 2, the circuit of a single peripheral station 22 is shown. It should be noted that the stations 22 have identical circuitry. This simplifies stockholding and installation and assists in reducing costs. The circuit of FIG. 3 has an input at 24 from the signal bus 14. The power bus 10 may be connected to powered devices via parallel bistable gates 26 controlled by the remainder of the circuit. The signal input at 24 passes to an amplitude discriminator 28 which has four outputs enabled respectively by signal levels C, D, (C or D) and (B or C). The receipt of a signal at level (C or D), i.e. a sync or clock pulse, causes an output pulse to be passed to an eight-way selector 30 which in turn passes every eighth of such pulses to a four-bit counter 32. The bits of the counter 32 are connected in parallel to a decode circuit 34. The decode circuit 34 has an address set externally, as will be described below, over leads 36.

It will thus be seen that the counter 32 is incremented by every eighth clock pulse. When the count held by the counter 32 is that set via the leads 36, the decode circuit generates an output on line 38 for one frame period. Line 38 is connected in parallel to gates G1-G8. These gates are also connected to sequential outputs of the eight-way selector 30, each output being enabled for one time slot period. Thus, when the particular station 22 receives an information frame corresponding to the address code set, the gates G1-G8 are sequentially enabled each for one time slot.

Received signals of level (B or C) are passed by the amplitude discriminator 28 to a pulse width discriminator 40 whose function is to separate the clock pulses, which are of lesser duration, from time slot information. Signals at level B are passed by output 42 to gates G1-G4 in parallel and are then used, via a command and verify circuit 44 to be described, to enable the gates 26. Ignoring for the moment the command and verify circuit 44, the operation is thus that the controlled devices connected to terminals 1,2,3, and 4 are turned on by B-level signals in time slots 1,2,3, and 4 respectively and are turned off by A-level signals in these slots. Similarly, inputs from sensors connected to terminals 5,6,7, and 8 are sequentially gated by gates G5-G8. Such inputs may be either on/off or analog. The gated sensor signals pass to a pulse width modulator 46 which generates an output signal onto the signal bus 14 during time slots 5,6,7, and 8. A typical set of output signals is shown in FIG. 3. Time slots 6 and 7 are occupied by tell-back signals monitoring the condition of devices controlled by the signals in time slots 2 and 3. Slot 6 represents an "off" tell-back signal and is wholly occupied by an A-level signal. Slot 7 represents an "on" tell-back signal and is wholly occupied by a B-level signal. Slots 5 and 8 are exemplarily shown as carrying analog coolant temperature and oil pressure signals. These are pulse width modulated, the fraction of the time slot determined full scale deflection for that signal. The timing of the output of the pulse width modulator 46 is synchronized with the time slots 5–8 by C-level or clock pulses switched by the amplitude discriminator over line 48.

The purpose of the command and verify circuit 44 is to provide signal security. This circuit operates in conjunction with a sync detector 50 connected to receive sync pulses from the amplitude discriminator 28. The sync detector 50 is also connected to the four-bit counter 32 by a line 52. On receipt of the sync pulse, the counter 32 should reset to zero, and the counter is so constructed that on resetting it transmits a pulse over line 52 to the sync detector 50. If both pulses arrive simultaneously, the sync detector emits a gating pulse on line 54 to the command and verify circuit 44.

The command and verify circuit comprises four channels, each connected between one of the gates G1–G4 and the respective output terminals 1–4. One such channel is shown in FIG. 6. The signal from an associated one of the gates G1–G4 is supplied over line 55 and is held in a resettable store 56, which may for instance be a bistable multivibrator. The stored signal is compared with the next signal gated to that channel by a comparator 58. If the two values agree, an enable signal passes by line 60 to a gate 62. The gate 62 is also connected to receive the gating pulse on line 54 from the sync detector 50, and to receive signals over line 64 from the pulse width discriminator 40. The first of these is provided to block execution of commands where there is a failure of synchronism in the system, and the second to ensure that a command signal is passed only during a suitable time slot. Thus a command signal will not be passed by the circuit 44 to the controlled device unless (1) the same signal is recieved twice in succession and (2) the address decode is operating correctly in synchronism with the master station. The first of these is principally a safeguard against a signal which is correctly timed but in which a positive pulse is dropped, while the second is of particular use in dealing with the case where an interference-induced spike appears on the signal bus and produces lack of synchronism. If either of these conditions is not met, the signal to the appropriate gate 24 is blocked and the controlled device continues in its preexisting state.

The sync detector 50 is also connected to the four-bit counter 32 to reset the latter on receipt of a sync pulse. (If the system is correctly in synchronism, the counter 32 will also be recycling to zero of its own accord at the same time).

It will be seen that this embodiment is capable of controlling 64 functions and a monitoring 64 sensors. Suitably, each information frame occupies 8 ms, giving a total cycle time of 128 ms. Since two consecutive identical signals are required to actuate controlled devices, the maximum delay in switching on or off is 256 ms. Readouts to the driver are updated every 128 ms. These speeds are sufficiently fast to be practically instantaneous from the driver's point of view while not requiring high pulse repetition rates.

Figure 4:
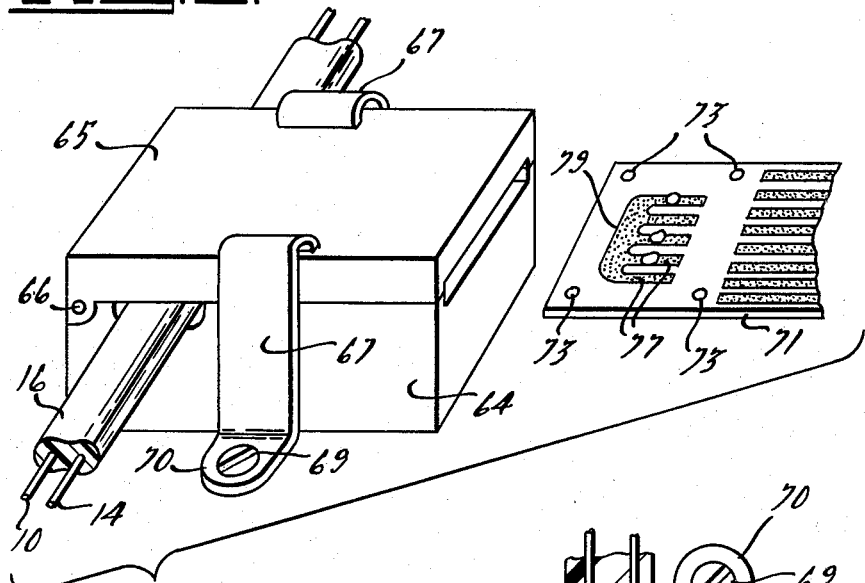
FIG. 4 is a perspective view of a peripheral station in position on a bus member of the system.
Figure 5:
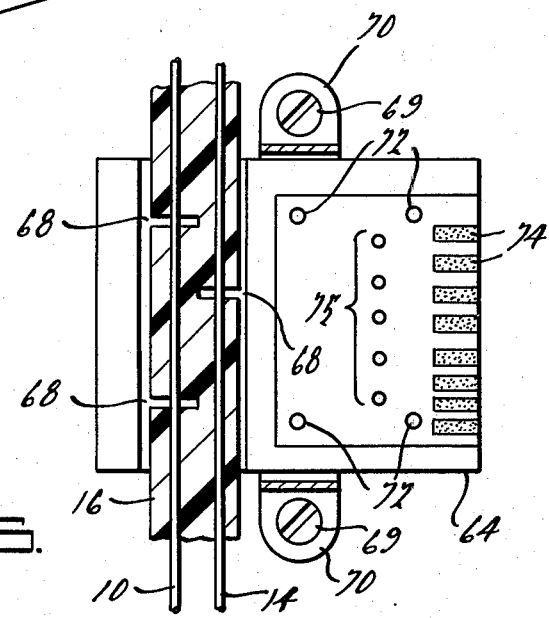
FIG. 5 is a plan view, partly in section, of the bus and peripheral station of FIG. 4 with a top cover of the peripheral station removed.

In FIGS. 4 and 5, one possible physical form of peripheral station is shown. The circuitry is encapsulated in a housing 64 which is formed with a recess dimensioned to accommodate the sheath 16. A cover 65 is hinged at 66 to the housing 64 and may be locked shut by spring steel arms 67. Connecting blades 68 extend from the housing 64 to effect connection with the buses 10 and 14. In use, slots for the blades 68 are performed at suitable locations on the sheath 16 and the bus member is positioned in the vehicle. At each station, a housing 64 is arranged in a position to receive the bus member with the connecting blades in contact with the buses 10 and 14. The housing is then secured to a vehicle body panel (not shown) as by self-tapping screws 69 passed through a metal strap 70 secured to the housing 64 and supporting the arms 67. The strap 70 and screws 69 suitably act as an electrical ground connector and heat sink. When the cover 65 is closed, the peripheral station also acts as a retainer for the bus member.

The connection to the associated devices and sensors is via a flexible printed circuit 71. This is located by means of pins 72 on the housing 64 passed through apertures 73 in the flexible printed circuit 71. Contact strips 74 on the housing 64 are provided for connection to the conductors of the circuit 71. The housing 64 is also provided with contacts 75 connected to the address decode circuit 34. A corresponding number of conductive strips 77 are formed on the circuit 71 and are interconnected at 79. The address for a given station is encoded on its circuit 71 by drilling or punching through selected strips 77 between the position of the respective contact 75 and the interconnection 79. In the embodiment shown, five strips 77 are provided, enabling sixteen addresses to be encoded.

FIG. 7 illustrates a preferred form of amplitude discriminator. A resistor chain 76, 78, 80, and 82 is connected across power supply lines 84 and 86. Supply line 86 is grounded and is thus at voltage level A. The resistors 76, 78, 80 and 82 are selected to give voltage levels B, C and D at the resistor junctions, and these are fed as inputs to respective comparators 88, 90, and 92. The input signal on line 24 is fed in parallel to the comparators 88, 90, and 92. The presence of voltage levels B, C and D is thus detected and results in an output at the respective comparator, these outputs being gated by an exclusive-OR gate 94 and OR gates 96 and 98 to give the required outputs of C, D, (C or D) and (B or C).

Figure 8:
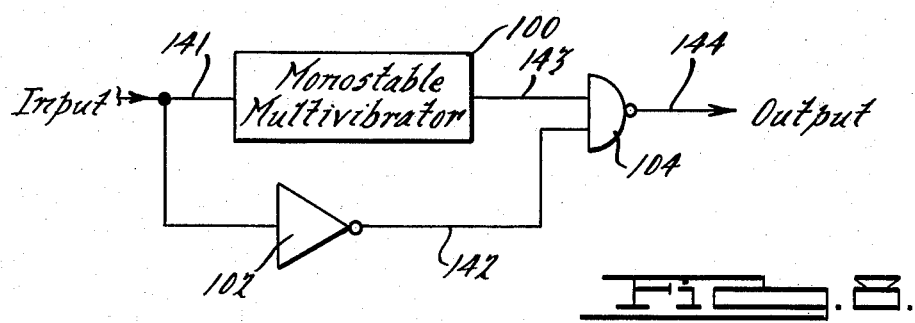
Figure 9:
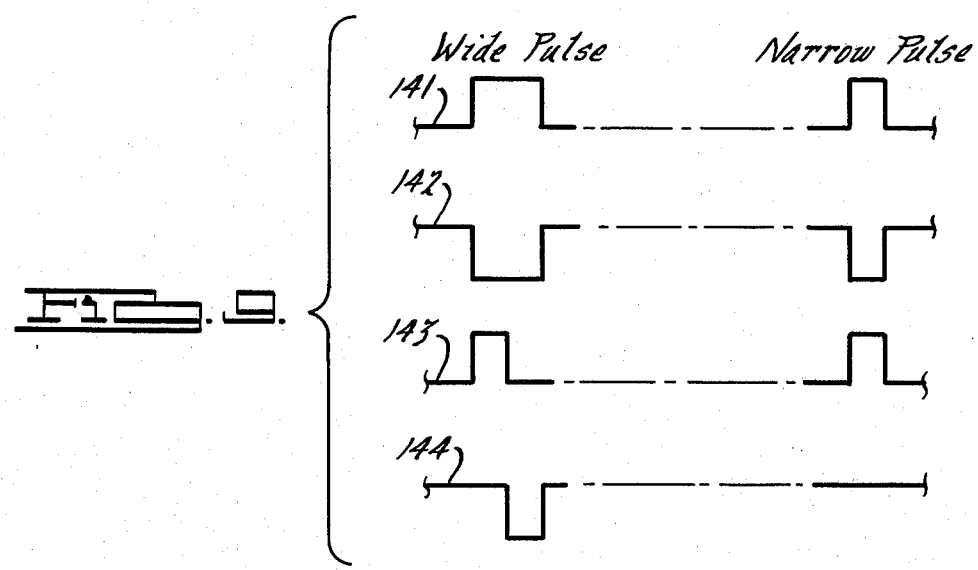
FIG. 9 illustrates waveforms in the circuit of FIG. 8.

A preferred form of pulse width discriminator is shown in FIG. 8. The discriminator is required only to differentiate wide and narrow pulses, and the waveforms for each of these at various points in the circuit are shown in FIG. 9. The (B or C) input from the amplitude discriminator 28 is applied in parallel to a monostable multivibrator 100 and an inverter 102. The monostable multivibrator 100 is arranged to give an output pulse duration equal to that of the narrow "C" pulse. The outputs of these are coupled to a NAND gate 104. Thus the input pulses to the gate 104 are of the same duration for a received narrow pulse and no output is generated at the output of gate 104, whereas when a wide pulse is received, the low signal from the inverter 102 is of shorter duration than the high signal from the monostable 100, and the gate 104 gives an output pulse for the time difference between the two. The waveforms 140, 141, 142 and 143 in FIG. 9 appear at the correspondingly numbered points in FIG. 8.

Figure 10:
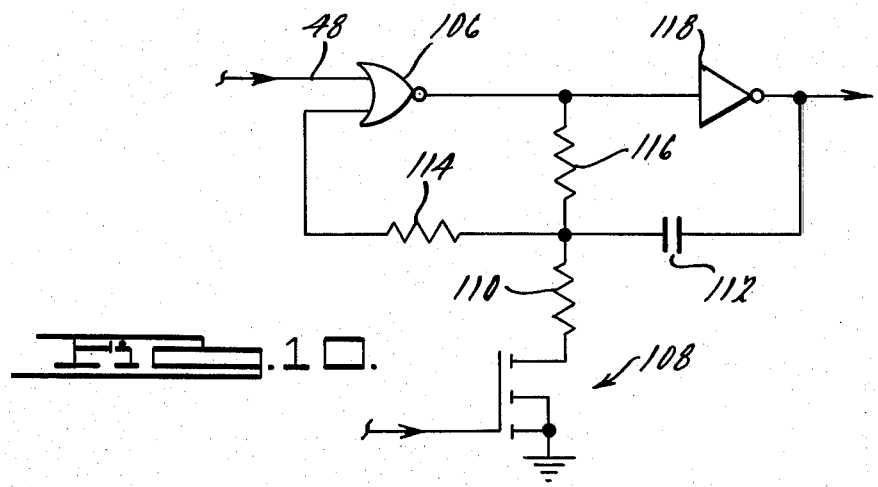

FIG. 10 shows a detailed circuit for the pulse width modulator 46. The clock pulses from the amplitude discriminator 28 are applied by line 48 to a NOR gate 106. The input signal from the appropriate one of gates G5–G8 passes to the base of a MOS gate 108. This input signal is an analog representation of the parameter to be transmitted, and acts to vary the resistance to ground of the MOS gate 108 and a serially connected resistor 110, thus varying the time constant of an RC circuit constituted by these and a capacitor 112. The other input of the NOR gate 106 is connected by a feedback resistor 114 to the junction point of the resistor 110 and capacitor 112. This point is also connected by a resistor 116 to the output of the NOR gate 106, both being coupled to the input of an inverting amplifier 118. The action of the circuit is as follows. On receipt of a "C" pulse on line 48, the output of the NOR gate goes low and the circuit output from the inverting amplifier goes high. After a time delay set by the RC constant of the elements 108, 110, 112 (and thus by the input signal at the base of the MOS gate 108), the output of the NOR gate switches to a high state and the circuit output goes low. Hence the value of the signal at the modulator input is represented in the signal bus waveform (FIG. 3) by the ratio of the high-level signal duration to the total slot time between the two appropriate clock pulses.

The master station 18 may readily be realized by those skilled in the art with well known techniques, and will therefore not be described in detail. It will be appreciated that it includes a suitable clock circuit generating "C" and "D" level pulses repetitively, and gating means for scanning control switches on a repetitive basis. Returning signals from remote analog sensors may suitably be demodulated to analog voltage signals and applied to voltmeter-type instruments; this is suitable for parameters such as road speed, engine speed and fuel contents.

The four-level pulse format of the present invention permits the required amount of information to be carried without the use of unduly long pulse trains and/or repetition rates. Moreover, all signal detection can be based on ratios rather than absolute values, and control of supply voltages is therefore not critical. At the same time, the invention permits the use of relatively It will be seen that the invention permits the use of identical peripheral stations whose addresses can be set by simple plug-in means, with consequent simplification of manufacture, stock holding and production control. The address setting means may take different forms from the printed circuit described above. For example, the peripheral station may be connected to its associated devices via individual leads and a multi-contact plug and socket, the address being set by interconnections between conductors in the plug or socket.

The invention also provides a peripheral station including a verifying means which nullifies the effect of failures in signal transmission, not only those where signal pulses are lost or distorted but also those due to interference causing spurious pulses or lengthening of the pulse train.

It will be appreciated that modifications may be made to the embodiment described within the scope of the invention, as defined in the claims. For instance, the input on the line 64 to the command and verify circuit 44 may be taken directly from a suitable output of the amplitude discriminator rather than being derived by pulse width discrimination. The four-bit counter 32 could be fed directly by a "D" output of the amplitude discriminator. The inputs from sensors may be omitted, together with the corresponding gates and the modulator 46, where only a control function is desired.

I claim:

1. An improved information handling system of the type which comprises a signal bus, a master station arranged to transmit on the signal bus pulse signals divided into serial information frames, a plurality of sensors or controlled devices, a plurality of peripheral stations, having address decoding circuitry, each connected to the signal bus for actuation in response to a given information frame, and a connector connecting each of the peripheral stations to at least one of the sensors or controlled devices, wherein the improvement comprises:

an address setting means in the connector, the address setting means setting a code determining the information frame to which the peripheral station associated with the connector responds, the connector comprising a housing through which the signal bus passes to facilitate electrical connection thereto, the connector further including a printed circuit having conductive strips located within the connector housing, the conductive strips being drilled or punched to set the code for the peripheral station, and the connector housing having contacts cooperating with the conductive strips and address decoding circuitry of the peripheral station.

* * * * *